United States Patent [19]
Sugimatsu et al.

[11] 3,975,569

[45] Aug. 17, 1976

[54] MAGNETIC RECORDING ELEMENT

[75] Inventors: Akihito Sugimatsu, Tokorozawa; Makoto Yorozu, Tokyo; Tadayoshi Nomura, Shiki; Isamu Yoshino, Kunitachi; Hachiro Yoshikawa, Tokyo, all of Japan

[73] Assignee: Sanyo-Kokusaku Pulp Co., Ltd., Tokyo, Japan

[22] Filed: Feb. 10, 1975

[21] Appl. No.: 548,332

Related U.S. Application Data

[63] Continuation of Ser. No. 346,983, April 2, 1973, abandoned.

[30] Foreign Application Priority Data

Apr. 4, 1972    Japan.............................. 47-33143

[52] U.S. Cl............................. 428/329; 252/62.53; 252/62.54; 252/62.56; 428/342; 428/478; 428/537; 428/539; 428/513; 428/514

[51] Int. Cl.² ..................... B32B 5/16; C04B 35/26; B32B 21/06

[58] Field of Search ...................... 117/235–240, 117/264; 428/900, 537, 478, 329, 342, 539, 513, 514; 252/62.54, 62.53, 62.56; 40/2.2

[56] References Cited
UNITED STATES PATENTS

| | | | |
|---|---|---|---|
| 3,047,505 | 7/1962 | Miller | 117/164 X |
| 3,053,676 | 9/1962 | Higbee | 117/164 X |
| 3,186,918 | 6/1965 | Salzberg | 117/164 X |
| 3,347,688 | 10/1967 | Frankenfeld | 117/164 X |
| 3,507,661 | 4/1970 | Ufstead | 117/164 X |
| 3,515,588 | 6/1970 | Sadler | 117/164 X |
| 3,725,285 | 4/1973 | Denk | 117/235 X |
| 3,794,519 | 2/1974 | Akashi | 428/900 X |

*Primary Examiner*—Marion E. McCamish
*Assistant Examiner*—Ellis P. Robinson
*Attorney, Agent, or Firm*—Kurt Kelman

[57]     ABSTRACT

A magnetic recording element suitable for use in an automatic ticket vending unit and an automatic ticket checking and collecting unit which comprises a substrate and a layer coated thereon, said coating layer comprising 100 parts, by weight, of γ-ferrite particles, 1 to 2 parts of a dispersing agent for γ-ferrite, 5 to 15 parts of an alkaline modified protein, 15 to 30 parts of a rubber-like synthetic polymer and 1 to 2 parts of a hardening agent for protein is disclosed.

1 Claim, No Drawings

MAGNETIC RECORDING ELEMENT

This is a continuation of application Ser. No. 346,983, filed Apr. 2, 1973, now abandoned.

This invention relates to a magnetic recording element suitable for use in automatic ticket vending unit and automatic ticket checking and collecting unit, in particular to a magnetic recording element comprising a substrate and a coating layer containing γ-ferrite particles, and relates to a process for producing such a magnetic recording element.

Recently, automatic ticket vending units and ticket checking and collecting units are widely used in railroad stations, parking lots, theaters and the like in order to save labor. The ticket used is usually a magnetic recording element and, on one side, there is printed surface indicating required items and on the other, a coated surface having magnetic property, for example a coated surface containing γ-ferrite particles. On an automatic ticket vending unit, required data such as date, price and so forth are printed on one side and on the other side on which the γ-ferrite-containing layer is provided, the informations of such required items as well as other items to be analysed and collected are written by a magnetic recording means. The magnetically written data are read out through the magnetic head of the checking unit, and checking and opening of the gate are automatically performed. Because the tickets are continuously and automatically sold by the automatic ticket vending unit, it is the usual practice that the ticket material be set up in the unit in rolled form and it is essential that such material should possess magnetic characteristic adapted to the characteristic of such vending unit, as well as antielectrostatic property under condition of high speed operation and curl free property under high humidity and wet conditions.

Furthermore, it is also important for the element according to this invention that the surface of γ-ferrite-containing coated layer be smooth and non-peeling, since in writing and reading out the data, the magnetic head is moved at a high speed (1–2 m/sec.) in contact with the surface of the element. After the elements or tickets have been recovered from the collecting unit, the elements are usually discarded, so low cost is an important requirement of the element and a major cost factor is the coating layer containing γ-ferrite.

In general, a coating composition containing γ-ferrite which has hereinbefore been applied to a substrate to produce a magnetic recording element is a suspension or dispersion of γ-ferrite in an organic solvent containing a binder. However, the use of such coating composition involves, for the purpose of this invention, inherent disadvantages in that the cost of the composition is high and application of the composition is complicated owing to the use of an organic solvent and, also, the coated surface of the resulting product is hydrophobic so the element tends to curl under high humidity.

Accordingly, an object of this invention is to provide a magnetic recording element suitable for use in an automatic ticket vending unit and a ticket checking and collecting unit which is curl free and has antielectrostatic properties.

Another object of this invention is to provide a process for producing such a magnetic recording element by applying to a substrate an aqueous composition comprising γ-ferrite particles, an alkali modified protein and a rubber-like synthetic polymer binder.

A coating composition suitable for use in a magnetic recording element is an aqueous composition comprising 100 parts, by weight, of γ-ferrite particles, 1 to 2 parts of dispersing agent for γ-ferrite, 5 to 15 parts of an alkali modified protein and 15 to 30 parts, as solid, of a synthetic resin emulsion or a synthetic rubber latex and 1 to 2 parts of a hardening agent for protein. The composition is prepared in the following manner: 100 parts, by weight, of γ-ferrite having a particle size of from 0.5 to 1 $\mu$, which corresponds to the size of single crystal, is mixed with 100 to 150 parts of water and 1 to 2 parts of a dispersing agent with agitation to prepare an aqueous slurry. Examples of the dispersing agent includes, for example, sodium pyrophosphate, sodium hexametaphosphate, sodium polyphosphate and sodium lignosulfonate. The reasons for selecting such amount of the dispersing agent is to produce an aqueous slurry of low viscosity. If the amount of the dispersing agent departs from such range, the viscosity becomes too high. The aqueous slurry is subjected to a treatment in a ball-mill, an Attritor type and Sandmill type dispersing device to produce a slurry having the particles in a uniformly dispersed state. When the aqueous slurry of γ-ferrite thus obtained is admixed with an aqueous emulsion of a synthetic resin or a synthetic rubber latex, precipitation or sedimentation of solid particles is observed and the emulsion or latex is destroyed. In order to avoid such defect, an alkali modified protein, that is a solution of protein in an aqueous alkaline solution, is admixed in an amount of 5 to 15 parts, by weight, as solid with the slurry containing 100 parts of γ-ferrite to produce a mixture having excellent stability. If the amount of the protein is less than specified amount, precipitation of particles from the emulsion or latex is not prevented; on the other hand, more protein than the specified amount tends to generate foam in the preparation of the coating composition and during the coating operation and results in non-uniform and porous coating layer which lowers the water resistance of the final product.

Examples of the protein are milk casein and soybean protein. The protein is dissolved in an aqueous solution containing 5 to 10%, by weight, for protein of an alkali, for example, aqueous sodium hydroxide, sodium carbonate, sodium borate and ammonia to obtain a 10 to 20%, by weight, aqueous solution of alkali modified protein.

The stabilized aqueous slurry of γ-ferrite is then mixed with a synthetic resin emulsion or synthetic rubber latex, the examples of which include poly(styrene-butadiene), poly(acrylonitrile-butadiene) and an acrylic resin, such as a polymer and a copolymer of an acrylate and a methacrylate (a solid content thereof being usually 40 to 50%). The proportion of γ-ferrite to the resin in such emulsion or latex is 100:15 to 30 by weight. If the amount of synthetic resin is less than the specified range, γ-ferrite particles contact each other in the coating layer in the final product to decrease its magnetic characteristics, especially residual magnetic flux density, and the surface strength is not sufficient to prevent peeling off of the coated layer when the element runs in close contact with the magnetic head. On the other hand, too much synthetic resin may improve both the magnetic characteristics and surface strength but leads to loss of thixotropy of the coating composition thereby causing a streaky non-uniform coated layer.

Finally, a hardening agent for protein is added to the mixture obtained as above. The hardening agent may usually be an amino-aldehyde synthetic resin, such as melamine-aldehyde and urea-aldehyde resins and polyacrylamide and is used in an amount of 10 to 20%, by weight, for protein.

The properties of the coating composition are 8 to 9 of pH, 30 to 40% of solids content and 0.5 to 50 pis of viscosity at 20°C. The coating composition is applied to a substrate by any of the conventional coating techniques including gravure coater, roll coater, reverse roll coater and blade coater in an amount of about 35 to 55 g/m² as solid. The substrates include, for example, coated paper, high grade paper and synthetic paper. In coating operation, the coating amount is readily adjusted by controlling the consistency of coating composition, and coating and drying of the composition are accomplished without any of the difficulties encountered in the case where a solvent type composition is employed. Then, the product is calendered to improve surface smoothness and to give a product substantially equivalent to that obtained with a solvent type composition.

The magnetic recording element according to this invention has advantages in comparison with those obtained by use of solvent type coating composition as follows: similar or equivalent magnetic characteristics, low cost, less penetration of γ-ferrite into substrate, improved hydrophilic property giving a curl free product and a product having antielectrostatic property due to the presence of alkali metal.

The invention will be illustrated by means of Examples but is not limited thereto and "part" is given by weight.

EXAMPLE 1

A mixture of γ-ferrite particles having a coercive force of 310 oersteds and a magnetic flux density of 2000 gauss, sodium polyphosphate and water in a proportion, by weight, of 100:1:150 was ballmilled for 24 hours to obtain a uniformly dispersed aqueous slurry.

A mixture of milk casein, water, sodium borate and 28% aqueous ammonia in a proportion, by weight, of 100:600:5:10 was heated at 50°C for about 15 minutes with agitation to produce an aqueous solution.

To the slurry containing 100 parts of γ-ferrite were added the aqueous solution containing 10 parts of milk casein with agitation for 15 minutes, followed by styrene-butadiene rubber latex (Dow Latex 620) in a proportion of 20 parts (as solid) and modified polyamide resin (Epinox P. 9007, DIC-Hercules Chemical Co.) as a hardening agent for casein of 1 part (as solid) in turn with agitation to obtain a uniformly dispersed coating composition. The viscosity and pH were 9.8 and 10 poise at 20°C.

The coating composition thus produced was applied in an amount of 45 g/m² (as solid) by a roll coater to paper having a basis weight of 155 g/m². After drying and calendering, paper suitable for use in automatic ticket vending unit was produced. The thickness was 0.21 mm, the magnetic force was 300 oersteds and the magnetic flux density was 1.7 maxwell/cm. Rolled paper of 30 mm × 300 m was set up in an automatic ticket vending unit and 10000 tickets on which required words were written by encoding magnetic head were tested. All the tickets were successfully checked with an automatic ticket checking and collecting unit. There were no stains on the magnetic head produced from peeling-off of γ-ferrite and no trouble caused by static charge.

EXAMPLE 2

One hundred parts of γ-ferrite (coercive force: 370 oersted and magnetic flux density: 200 gauss), 2 parts of sodium lignosulfonate and 150 parts of water were charged into an Attritor type dispersing machine and agitated for 4 hours to produce an aqueous slurry. One hundred parts of soybean protein was dissolved in a mixture of 600 parts of water and 5 parts of sodium hydroxide at a temperature of 45° to 50°C with agitation.

To the aqueous slurry containing 100 parts of γ-ferrite was added the protein solution containing 15 parts of protein to obtain a uniform mixture to which added was acrylonitrile-butadiene rubber latex (Hycar 1551) as 30 parts of solid content and melaminealdehyde resin (Sumiretz SZ 613) as 3 parts of solid content to produce a coating composition. The characteristics of the composition were viscosity of 15 poise at 25°C and pH of 10.5.

The coating composition was applied in an amount of 35 g/m² as solid to paper having a basis weight of 157 g/m² by gravure roll coater. After calendering, the product has a coercive force (Hc) of 330 oersted and a residual magnetic flux density of 1.4 maxwell/cm. The surface resistance of the product was $10^{-11}\Omega$-cm (at 45% R.H.) and was far less than that of paper which was usually on the order of $13^{-3}\Omega$-cm, thus less tendency of accumulating electrostatic charge was expected.

The product in roll form was set up in an automatic ticket vending unit and the required words were written by an encoding magnetic head. The recorded memories were visualized by depositing finely divided iron powder thereon and it was found that the words were exactly written as compared with the clock pulse track.

EXAMPLE 3

The coating composition produced in Example 1 was applied in an amount 50 g/m² as solid to paper having a basis weight of 200 g/cm², and after drying and supercalendering there was obtained paper suitable for use in an automatic ticket vending unit having a thickness of 0.25 mm, a coercive force of 290 oersteds, a residual magnetic flux density ($\phi r$) of 1.85 maxwell/cm.

Paper roll of 57 mm × 800 m was set up in an automatic parking lot ticket vending unit, and the required words were written on the coated layer by an encoding magnetic head and 300,000 tickets were tested.

No stain on writing and reading out magnetic heads and no curling of ticket were observed and the performances of parking lot payment unit and gate detecting unit was satisfied.

What is claimed is:

1. A magnetic recording element suitable for use in an automatic ticket vending unit and an automatic ticket checking and collecting unit which consists essentially of a substrate of sheet paper and a layer coated thereon, said layer consisting essentially of 100 parts by weight of ferrite particles, 1 to 2 parts by weight of a dispersing agent for the ferrite having a particle size of 0.5 to 1 micron, said dispersing agent selected from the group consisting of sodium pyrophosphate, sodium hexametaphosphate, sodium polyphosphate and sodium lignosulfonate; 5 to 15 parts by weight of an alkaline modified protein, said alkaline modified protein selected from the group consisting of alkaline modified milk casein and alkaline modified soybean protein; 15 to 30 parts by weight of a rubber-like synthetic polymer selected from the group consisting of poly(styrene-butadiene), poly(acrylonitrile-butadiene) and acrylic resin; and 1 to 2 parts by weight of a hardening agent for said protein, said hardening agent selected from the group consisting of aminoaldehyde resin and modified polyamide resin, said layer disposed onto said sheet of paper in an amount of about 35 to 55 g/m$^2$.

* * * * *